Oct. 27, 1936.      E. J. PARDON ET AL      2,058,820
ROLLER SKATE
Original Filed June 29, 1935

INVENTORS
ERNEST J. PARDON
AND ADOLPH H. FRITZ,
BY
ATTORNEY

Patented Oct. 27, 1936

2,058,820

UNITED STATES PATENT OFFICE 2,058,820

ROLLER SKATE

Ernest J. Pardon, Torrington, and Adolph H. Fritz, Litchfield, Conn., assignors to Union Hardware Company, Torrington, Conn., a corporation of Connecticut Original application June 29, 1935, Serial No. 29,040. Divided and this application December 4, 1935, Serial No. 52,780

4 Claims. (Cl. 208—179)

The present invention relates to improved structures for roller skates. This application is a division of an application of Ernest J. Pardon and Adolph H. Fritz, Serial Number 29,040, filed June 29th, 1935, for "Roller skate". More particularly the present application contemplates improvements in the wheel-supporting elements of roller skates.

One object of the invention is to produce a simplified and strong truck and carrier assembly for skates to be used at the front or rear of the same.

Another object is to make a wheel carrying structure of sheet metal and to increase the ease of manufacture and assembly of the parts.

Still another object is to eliminate the necessity of a trunnion pin between the truck and carrier and yet provide ample bearing surface in place thereof.

The above objects, and others, are accomplished by making the truck body and the carrier body of sheet metal. These parts are cut, punched, stamped and struck into the desired configuration and finally assembled with a rubber cushion block into a unitary structure, the wheel or axle carrier having perforations forming bearings for inturned tubular pintle lugs.

The preferred form of the invention will be clear from the following description and claims, taken in connection with the accompanying drawing, in which:

Figure 1:
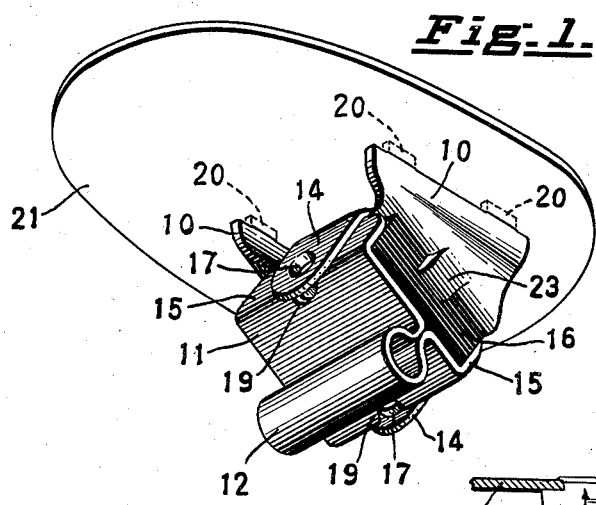
Fig. 1 is a perspective of the assembled truck hanger and wheel carrier attached to the underside of a skate foot plate.
Figure 2:
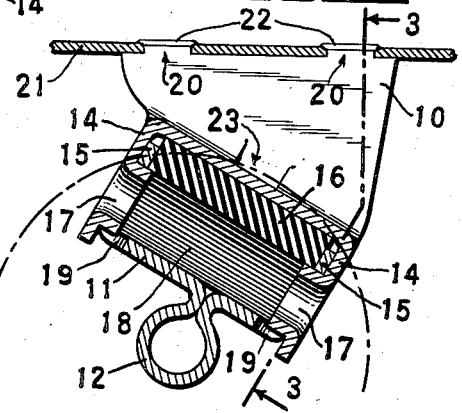
Fig. 2 is a vertical longitudinal section through the parts.
Figure 4:
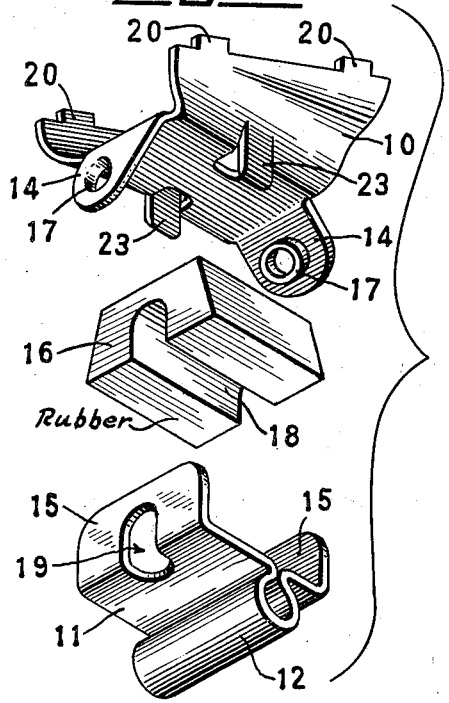
Fig. 4 is an exploded perspective of the parts just before final assembly.
Figure 3:
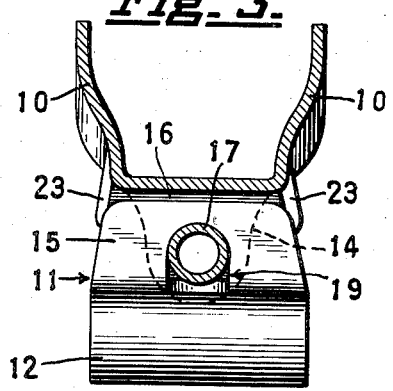
Fig. 3 is a section on the plane of the line 3—3 of Fig. 2.

In the preferred form of the invention, a sheet metal truck member 10, of generally U-shaped transverse section, is connected to an axle bracket or carrier plate 11, also of sheet metal. The carrier 11, has a wheel axle loop 12 in which the axle is held, supporting the wheel 13 (dotted outline in Fig. 2).

The connection and bearing between truck and carrier is made through the medium of front and rear flanges 14 on the truck 10 and corresponding front and rear flanges 15 on the carrier 11. The flanges 15 extend across the ends of a resilient rubber block 16 which is used to cushion the wheels and permit sidewise rocking.

Instead of the ordinary trunnion pin extending through the truck and carrier flanges, integral lugs or projections 17 are stamped or drawn from the outer flanges 14.

These lugs, of tubular form, extend into passages in the inner flanges, connect the truck and carrier together and form relatively large bearing surfaces for the parts.

The block 16 is grooved at 18 and the lugs extend into the ends of the groove to aid in holding the rubber block from transverse shifting. This groove, shown in the bottom surface of the block, also facilitates the insertion of the lugs 17 through slots 19 in the carrier flanges. The slots 19, it should be noted, extend slightly beyond the base of the flanges into the body portion of the carrier.

Lugs 20, on the top of the truck sides, may be provided for securing the structure to the foot plate 21 of the skate. The lugs are headed or riveted over as at 22, to make a proper joint.

In assembling the parts, the rubber block is seated between the flanges 15 on the bottom plate of the carrier 11. The carrier and the truck 10 are then brought together and the flanges 14 are bent inwardly, the bearing lugs 17 entering the slots 19 and holding the parts against separation. The rubber block, under pressure, resiliently urges the lugs 17 toward the top ends of the slots 19.

Side lugs or flanges may be struck out of the truck 10 to assist in holding the rubber block 16 against transverse movement and prevent undue spreading of the same.

By means of the above structure, a strong and inexpensive mounting for the wheel axle is produced. The small number of necessary parts, their ease of manufacture and assembly and their mechanical design offer distinct advantages over existing structures.

The cylindrical tubular form of the lugs 17 increases the extent of the effective bearing surfaces between truck and carrier. Because the slots 19 extend into the body portion of the carrier as well as through the flanges, the lugs 17 can be easily positioned in assembly, and the lugs and slots have an extended degree of freedom to play. The grooved block is cheaper than a solid block of the same over-all dimensions.

Although a pintle is ordinarily unnecessary in this construction, a pin or rivet may be inserted through the tubular bearing member 17 and through the groove 18 to reinforce the truck if desired.

We claim:

1. A skate truck comprising a bottom plate having a support for an axle and front and rear flanges and an opening in each flange, a top plate having end flanges with indrawn bearing members extending into the openings in the flanges of the bottom plate, and a resilient block having a groove in its lower face, into the ends of which said bearing members project near said bottom plate.

2. A skate truck comprising a bottom plate having a support for an axle, and front and rear flanges integral therewith and an opening in each flange, a top plate having end flanges with indrawn bearing members extending into the openings in the flanges of the bottom plate, and a resilient block held between said top and bottom plates and the flanges of the bottom plate.

3. A skate truck consisting of upper and lower plates each having front and rear flanges, the flanges of the upper plate having tubular cylindrical bearings projecting toward each other and through openings in the flanges on the lower plate and a resilient block held under pressure between the upper and lower plates and between the flanges of the lower plate, said block having a groove into the ends of which said tubular bearings project.

4. A skate truck comprising a sheet metal bottom plate having a support for an axle and having front and rear flanges, and an opening in each flange near the lower part of the bottom plate, a top plate having end flanges with indrawn bearing members extending into the openings in the flanges of the bottom plate, and a resilient block held between the flanges of the bottom plate and having a groove in its lower part into the ends of which said bearing members project near the lower part of the bottom plate.

ERNEST J. PARDON.
ADOLPH H. FRITZ.